United States Patent [19]

Nagasawa et al.

[11] 4,205,018

[45] May 27, 1980

[54] RADIATION CURABLE RESIN COMPOSITION

[75] Inventors: Kohtaro Nagasawa; Osamu Ogitani, both of Tokyo; Ryuichi Fujii, Soka, all of Japan

[73] Assignee: Somar Manufacturing Co., Ltd., Tokyo, Japan

[21] Appl. No.: 957,502

[22] Filed: Nov. 3, 1978

[30] Foreign Application Priority Data

Nov. 3, 1977 [JP] Japan .................. 52-132053
Nov. 14, 1977 [JP] Japan .................. 52-135766

[51] Int. Cl.² .................................................. C08L 61/02
[52] U.S. Cl. ........................ 525/404; 204/159.15; 427/44; 525/405; 525/408
[58] Field of Search .................................. 260/828

[56] References Cited

U.S. PATENT DOCUMENTS

| | | | |
|---|---|---|---|
| 3,118,851 | 1/1964 | Harvey | 260/828 |
| 3,121,703 | 2/1964 | Harvey | 260/828 |
| 3,876,432 | 4/1975 | Carlick | 260/828 |
| 3,935,144 | 1/1976 | Hagenweiler | 260/828 |

*Primary Examiner*—Pal Lieberman
*Attorney, Agent, or Firm*—Sughrue, Rothwell, Mion, Zinn and Macpeak

[57] ABSTRACT

A resin composition is disclosed comprising, as essential ingredients, (I) a urethanized epoxy resin or a urethanized epoxy resin acrylate or methacrylate, (II) a ketone resin and (III) a cross-linkable or polymerizable compound containing at least two ethylenically unsaturated groups.

11 Claims, No Drawings

RADIATION CURABLE RESIN COMPOSITION

BACKGROUND OF THE INVENTION

1. Field of the Invention

This invention relates to a resin composition curable by actinic radiation which does not substantially contain an acid group and has good adhesion, flexibility and other properties to be described hereinbelow.

2. Discussion of the Prior Art

Various photocurable resin compositions using ultraviolet light as the active energy radiation have been known heretofore. A typical composition comprises a polymerizable oligomer having at least two ethylenically unsaturated groups such as an unsaturated polyester or acrylated epoxy resin, a low molecular weight photopolymerizable difunctional, trifunctional, etc., cross-linking agent containing at least two ethylenically unsaturated groups (e.g., ethylene glycol diacrylate, diethylene glycol diacrylate, polyethylene glycol diacrylate (the number of ethylenically unsaturated groups, n=3 to 12), 1,4-butanediol diacrylate, 1,6-hexanediol diacrylate, trimethylolpropane triacrylate, pentaerythritol triacrylate and methacrylate homologues thereof, and divinylbenzene, divinyl sulfone, diallyl phthalate, diallyl benzene, diallylamine, and the like), and a photopolymerizable monofunctional compound, called a diluent (e.g., methyl acrylate, ethyl acrylate, propyl acrylate, butyl acrylate, benzyl acrylate and methacrylate homologues thereof, 2-hydroxypropyl acrylate, 2-hydroxypropyl methacrylate, α-methylstyrene, vinyltoluene, vinylxylene, vinyl acetate, vinylacetic acid, vinylpyridine, and tetrahydrofurfuryl acrylate, 2-ethylhexyl acrylate, cyclohexyl acrylate, methoxy diethylene glycol acrylate, diethylaminoethyl acrylate, and their corresponding methacrylate derivatives), typified by the addition of 2-hydroxyethyl methacrylate or styrene to adjust the viscosity of the composition and change the rate of photocuring.

It is the common practice with such photocurable resins to increase the number of the unsaturated groups in the polymerizable oligomer or to increase the proportion of the polymerizable cross-linking agent and thus increase the number of cross-linkages in order to increase the rate of photocuring. However, as the cross-linking density increases, internal stress occurs in the photocured film and its adhesion to the adherend or substrate is reduced. Furthermore, the resulting coated film is very brittle.

It has been suggested to plasticize the coating and simultaneously increase its adhesion by incorporating a plasticizer in the resin composition, but this far from achieves the intended object.

Japanese Patent Application (OPI) No. 21205/1974 (The term "OPI" as used herein refers to a "published unexamined Japanese patent application") discloses a mixture of epoxy acrylate and an ethylenically unsaturated monomer, which scarcely adheres to glass, and its adhesion to metal surfaces is also weak.

Furthermore, the method for increasing adhesion disclosed in Japanese Patent Application (OPI) No. 125182/1976 in which a ketone resin is used in conjunction with a product obtained by esterifying one or more of the three protons of phosphoric acid to introduce an unsaturated group, for example, a β-methacryloxy ethyl ester of phosphoric acid, suffers from several drawbacks. Since the phosphate ester is strongly acidic, the ester bond eventually tends to undergo hydrolysis and when a resin composition is actually formulated, hydrolysis occurs and the resin is degenerated and discolored. When this resin is coated on the surface of metal, degeneration of the metal surface is also observed. This is especially pronounced in the case of copper.

Resin compositions curable by the irradiation of light waves or other actinic energy radiation, such as electron beams, X-rays, β-rays and γ-rays (hereinbelow referred to as curable resins or simply resin compositions) must be stable and have good storability. Also, they should not bring about chemical changes on the surfaces of the substrates which they are coated upon. Furthermore, the cured coated films would have superior adhesion, flexibility, corrosion resistance, thermal stability, etc. As can be seen from the examples described hereinabove, none of known compositions are considered to meet all of these requirements.

Curable resin compositions having satisfactory storage stability, cured film adhesion and flexibility, and other properties have been investigated, and these investigations have led to the invention described below in detail.

SUMMARY OF THE INVENTION

Accordingly, a principle object of the present invention is to provide a resin composition curable by electromagnetic waves or particle beams which is stable, has good storability and does not cause chemical changes to occur on the surface of the substrate upon which it is coated.

A further object of the present invention is to provide a radiation curable composition which is capable of quickly curing upon exposure to actinic radiation and which adheres very well to the substrate upon which it is coated.

Another object of the present invention is to provide a radiation curable resin composition having good storage stability, cured film adhesion and flexibility.

Still another object of the present invention is to provide a curable resin coating composition having superior adhesion to the surfaces of various substrates, such as paper, wood, polywood, plastics, glass and metals.

A further object of the present invention is to provide a composition which can be used as a solder resist or as a resist in forming a printed circuit board.

These and other objects are attained by the present invention which is described hereinbelow in detail.

DETAILED DESCRIPTION OF THE INVENTION

The present invention is a resin composition curable by electromagnetic waves or particle beams, such as, but not limited to, ultraviolet light and electron beams. The resin composition comprises, as essential ingredients, (I) a urethanized epoxy resin obtained by reacting an epoxy resin containing at least one hydroxyl group with a compound containing at least one isocyanate group, or a urethanized epoxy resin acrylate or methacrylate obtained by the addition of acrylic acid or methacrylic acid to said urethanized epoxy resin, (II) a ketone resin obtained by condensing a ketone compound with an aldehyde, and (III) a polymerizable cross-linking agent or polymerizable oligomer containing at least two ethylenically unsaturated groups derived from acrylic acid or methacrylic acid. Components (I), (II) and (III) are present in the composition in amounts of:

2-55% by weight, based on the total weight of the composition, of urethanized epoxy resin or urethanized epoxy resin acrylate or methacrylate, 5-40% by weight of ketone resin and 5-93% by weight of cross-linkable or polymerizable Component (III). More specifically, Components (I), (II) and (III) are present in the composition in amounts disclosed below.

Generally speaking, the urethanized epoxy resin acrylate or methacrylate is preferred as Component (I) above because it exhibits better curability (i.e., a shorter curing time) and solvent resistivity.

The three essential ingrendients, Components (I) to (III), contained in the curable resin composition of this invention are described in detail below.

The urethanized epoxy resin (I) is a product obtained by reacting a compound containing at least one epoxy group and at least one hydroxyl group (for example, an epoxy resin containing at least one hydroxyl group) with a compound containing an isocyanate group to form a urethane linkage between the hydroxyl group and the isocyanate group. Urethanized epoxy resins of this type are utilized in the art as flexible epoxy resins to form room temperature or heat curable resins by mixture with epoxy curing agents, and many types of them are commercially available.

The epoxy resin which can be used to form the urethanized epoxy resin preferably has the following properties: molecular weight: about 400 to about 5,000; hydroxyl number: 1 to 6; melting point: about 20° to 160° C.; and number of epoxy groups: 1 to 10. The synthesis thereof is further illustrated in, for example, W. R. Sorenson and T. W. Campbell ed., *Preparative Methods of Polymer Chemistry*, 2nd Ed., Interscience Publishers, pp. 465-466 (1968). Examples of commercially available epoxy resins which can be used for the above-described purpose are Epikote #834, #1001, #1002, #1004 and #1009 (products of Shell Chemical Corp.); D.E.R. #337, #661, #662, #664 and #668 (products of Dow Chemical Corp.), and the like. The epoxy resin used to form the urethanized epoxy resin is, for example, a product formed by reacting bisphenol A [2,2-bis(4-hydroxyphenyl)propane] and epichlorohydrin. When they are reacted in a molar ratio of 2:3, 3:4, or 4:5, an epoxy resin containing 1, 2 or 4 hydroxyl groups will be formed in theory.

Instead of the bisphenol A mentioned above, there can also be used, for example, bisphenol B [2,2-bis(4-hydroxyphenyl)butane], a halogenated bisphenol A [for example, 2,2-bis(3,5-dichloro-4-hydroxyphenyl)propane], 2,2-(2',4'-dihydroxyphenyl-4''-hydroxyphenyl)-propane, 4,4'-dihydroxybiphenyl, 4,4'-dihydroxydiphenylsulfone (bisphenol S), resorcinol, saligenin, phloroglucinol, and hydroxybenzoic acid.

Furthermore, instead of the epichlorohydrin, β-methyl epichlorohydrin, epibromohydrin, etc., may be used.

A novolak-type epoxy resin prepared from a novolak resin and epichlorohydrin has a methylol hydroxyl group, and can be used directly. Commercially available novalak-type epoxy resins are: Plyophen TD-2093 (containing 6 phenol rings), Plyophen TD-2090 (containing 8 phenol rings), Plyophen TD-2665 (containing 4 to 5 o-cresol rings), and plyophen TD-2663 (containing 6 o-cresol rings), all by Dai Nippon Ink & Chemical Co.; and MP-120 and MP-120HH (probably containing 6 phenol rings) by Gunei Chemical Industries Co.

As the isocyanate compound, there can be applied phenylene diisocyanate, tolylene diisocyanate, hexamethylene diisocyanate, hydrogenated tolylene diisocyanate, lysine isocyanate, liquid urethane prepolymers having a molecular weight of about 300 to about 1,500 and containing 1 or 2 isocyanate groups obtained by reacting a diisocyanate compound with a polyol (containing 1 to 20 hydroxy groups) such as ethylene glycol, diethylene glycol, triethylene glycol, glycerol or polyester containing 1 to 4 hydroxyl groups, and mono-substitution products thereof such as ethyl isocyanate or phenyl isocyanate.

As the urethanized epoxy resin should be compatible with Components (II) and (III) in the present invention, there is a limit on the number of urethane groups in the resin. However, the number of urethane groups cannot be unequivocally defined because the compatibility varies depending not only on the number of urethane moieties but also on other chemical constitution of the resin. Taking into consideration the above fact, the number of urethane groups in the resin may range from 1 to 5, however. The acrylate or methacrylate groups in the epoxy resin acrylate or methacrylate are not necessarily terminal. In case of novolak epoxy resins, the acrylate or methacrylate groups are introduced at the side chain. The number of acrylate or methacrylate functionality is generally from 1 to 10, but, the upper limit is not critical.

The polyaddition between the hydroxyl group-containing epoxy resin and the isocyanate compound can be performed using methods known in the art, and for example of such a synthesis is illustrated below.

General description on the reaction between the hydroxyl and isocyanate groups to form urethane bonding is given in, for example, S. R. Sandler and W. Karo, *Organic Functional Group Preparations*, Vol. II, pp. 223-234, Academic Press (1971). In the present invention, the reaction condition under which the gellation of the resin takes place due to cross-linking of the epoxy functionality should be avoided. The reaction between the two components, i.e., a resin containing a hydroxyl group(s) and an isocyanate compound, is usually carried out in the presence of an inert solvent. Suitable examples of inert solvents which can be used include, for example, ethers such as tetrahydrofuran or dioxane, esters such as ethyl acetate or methyl cellosolve acetate, and aromatic solvents such as benzene or chlorobenzene. However, for the sake of convenience, one or more diluents which contain an acrylate or methacrylate group such as trimethylolpropane triacrylate or ethylene glycol diacrylate are advantageously utilized.

In case that the hydroxyl group-containing resin and the isocyanate compound are reacted without using a catalyst, the reaction temperature is generally held in the range of from about 70° to 100° C., and the reaction is continued until no isocyanate group remains unreacted in the reaction mixture. When the catalyst is used, the reaction temperature is substantially lowered, i.e., practically as low as about 40° C. Suitable examples of catalysts which can be used include tertiary amines such as triethylamine, organic tin compounds such as dibutyl tin acetate, quaternary ammonium salts such as triethylbenzyl ammonium chloride, and the like. A suitable amount of the catalyst to be added in the reaction mixture ranges from about 0.001 to about 0.1 mol% per mole of the isocyanate compound.

SYNTHESIS EXAMPLE 1

174 Parts by weight of tolylene diisocyanate (having a 2,4-disubstitution product/2,6-disubstitution product ratio of about 80/20) and 53 parts by weight of diethylene glycol were reacted at 80° C. in 400 parts by weight of trimethylolpropane triacrylate to prepare a urethane prepolymer having an isocyanate group at both ends. To the prepolymer was added 62 parts by weight of Epikote 834 (a bisphenol A type epoxy resin made by Shell Chemical). These materials were reacted until the absorption of —NCO disappeared from the infrared absorption spectrum. Thus, a trimethylolpropane triacrylate solution of urethanized epoxy resin was prepared. (The trimethylolpropane triacrylate is a Component (III) ingredient as discussed below.)

The urethanized epoxy resin acrylate or methacrylate is obtained by reacting the urethanized epoxy resin described above with acrylic acid or methacrylic acid to add acrylic acid or methacrylic acid to the epoxy group.

It is preferred to react an equivalent amount of the unsaturated acid based on the epoxy group content of the resin. Advantageously, this addition reaction is carried out in the presence of a catalyst such as a tertiary amine such as triethylamine, tri-n-butylamine, dimethylbenzylamine or triethanolamine; an ammonium salt such as triethylbenzyl ammonium chloride or methyltrinitryl ammonium iodide; a basic heterocyclic compound such as quinoline or isoquinoline; a metal soap such as tin octylate; or an organic strong acid such as p-toluenesulfonic acid. A non-functional organic solvent may be used as a reaction diluent. However, the use of the low viscosity Component (III) containing ethylenically unsaturated groups, one of the essential ingredients of the invention, as a diluent is logical.

The addition reaction of the unsaturated acid with the urethanized epoxy resin is illustrated by the following Synthesis Examples 2 and 3.

SYNTHESIS EXAMPLE 2

| | parts by weight |
|---|---|
| Urethanized Epoxy Resin (EPU-10 having an epoxy equivalent of 320 to 360 and a viscosity (at 40° C.) of 150 to 300 poises, a product of Asahi Denka) | 68 |
| Acrylic Acid | 14.4 |
| Triethylbenzyl Ammonium Chloride | 0.5 |
| Trimethylolpropane Triacrylate (functional diluent) | 55 |
| Hydroquinone Monomethyl Ether (heat polymerization inhibitor) | 0.14 |

A mixture of the above ingredients was reacted at 100° C. while blowing dried air through the system to prepare a trimethylolpropane triacrylate solution of urethanized epoxy acrylate having a viscosity (at 25° C.) of 250 poises and an acid value of 3.5.

SYNTHESIS EXAMPLE 3

| | parts by weight |
|---|---|
| Urethanized Epoxy Resin (EPU-6 having an epoxy equivalent of 220 to 250 and a viscosity (at 25° C.) of 450 to 650 poises, a product of Asahi Denka) | 94 |
| Acrylic Acid | 28.8 |
| Trimethylolpropane Triacrylate | 61.4 |
| Tin Octylate (tin content 28%) | 1.2 |
| Benzyl Dimethylamine | 0.5 |
| Hydroquinone Monomethyl Ether | 0.2 |

A mixture of the above ingredients was reacted at 100° C. while blowing dried air through the system to prepare a trimethylolpropane triacrylate solution of urethanized epoxy acrylate having a viscosity (at 25° C.) of 230 poises and an acid value of 4.1.

The ketone resin (II) is a resin obtained by condensing a ketone of a relatively simple structure having therein 3 to 10 carbon atoms, such as acetone, methyl ethyl ketone, cyclohexanone or acetophenone with a lower aliphatic aldehyde having therein 1 or 2 carbon atoms, typified by formaldehyde and acetaldehyde. Ketone resins having various properties are commercially available. The ketone resin has generally been used as an adhesiveness improver or polymeric plasticizer for heat-curable or room temperature curable lacquers, paints, etc. Heating a ketone and an excess of an aldehyde to about 60° to about 100° C. in the presence of an alkaline catalyst (e.g., sodium hydroxide, potassium hydroxide, etc.) easily includes dehydro-condensation to give a ketone resin through the formation of methylol derivatives. For example, the case of reacting acetophenone and formaldehyde is illustrated as follows:

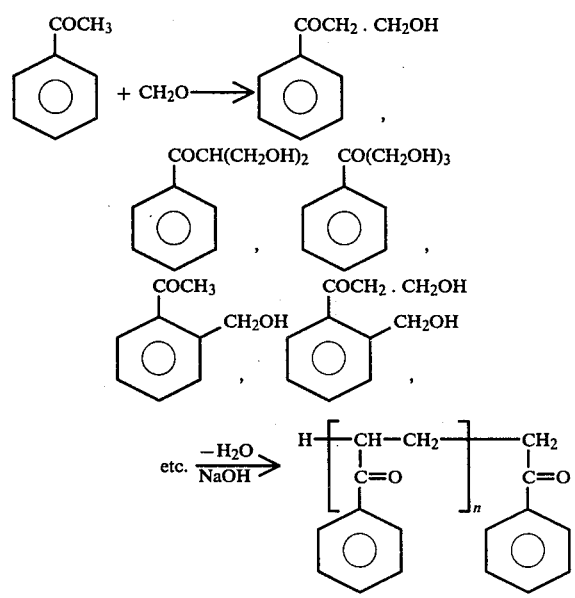

From these many methylol derivatives there is formed a polymer having a complicated methylene linkage derived from methylol groups which cannot be unequivocally determined.

The ketone resin which can be used in the present specification preferably has a softening point of about 90° to about 130° C. and an acid value of below 1, and is colorless to faint yellow (Gardener Color Number ≦1). Examples of commercially available ketone resins which can be used for the above-described purpose are Hilac 110 and Hilac 111 (products of Hitachi Chemical Co., Japan); Kunstharz AFS (a product of Bayer); Resin MS 2 (a product of Howard & Sons); Kunstharz AP (a product of Huml/u/ ls); Aron KR (a product of Toa Gosei Kagaku Kogyo, Japan) and the like.

The Component (III) having at least two ethylenically unsaturated groups is classified roughly into polymerizable cross-linking agents and polymerizable oligomers.

Examples of the polymerizable cross-linking agents include an acrylate or methacrylate obtained by esterifying a compound having about 2 to 6 hydroxyl groups with acrylic acid or methacrylic acid to introduce unsaturated groups. Specific examples are ethylene glycol diacrylate, diethylene glycol diacrylate, trimethylol propane triacrylate, 1,4-butanediol diacrylate, 1,6-hexanediol diacrylate, pentaerythritol tetraacrylate, dipentaerythritol polyacrylate (the number of acrylate groups being not more than 6), polyethylene glycol diacrylate, 2,2'-bis(4-acryloxydiethoxyphenyl)propane, and the corresponding methacrylates of these compounds. Usually, polymerizable cross-linking agents having a molecular weight of about 150 to about 1,000 and 2 to 6 ethylenically unsaturated bonds are used for the purpose of the present invention and preferably 2 to 4 bonds.

Suitable polymerizable oligomers are (a) polyester acrylates or polyester methacrylates which are liquid at room temperature and can be obtained by reacting low molecular weight polyesters having a molecular weight of about 300 to about 6,000 and having 2 to 6 free carboxyl groups with hydroxyalkyl acrylates or hydroxyalkyl methacrylates, or polyester acrylates or polyester methacrylates obtained by reacting low molecular weight polyesters having a molecular weight of about 300 to about 6,000 and having 2 to 6 free hydroxy groups with acrylic acid or methacrylic acid. Furthermore, (b) epoxy acrylates or epoxy methacrylates obtained by polyaddition of acrylic acid or methacrylic acid to unmodified epoxy resins having a molecular weight of about 300 to about 6,000 and having 2 to 6 epoxy groups and in the case of an epoxidized novolak resin 6 or more, (c) urethane acrylates or urethane methacrylates obtained by reacting prepolymers having 2 to 6 isocyanate groups with hydroxyalkyl acrylates or hydroxyalkyl methacrylates are also suitable as polymerizable oligomers.

Raw materials for the polymerizable oligomers are illustrated specifically. The low molecular weight polyesters (polyester prepolymers) are prepolymers usually having a molecular weight of about 300 to about 6,000 and containing free carboxyl groups or free hydroxyl groups which are obtained by dehydrocondensation of an acid component such as an aliphatic unsaturated dibasic acid or aromatic dibasic acid or an anhydride thereof (e.g., maleic anhydride, fumaric acid, itaconic acid, phthalic anhydride or isophthalic acid) or an aliphatic saturated dibasic acid or an anhydride thereof (e.g., succinic anhydride, adipic acid, glutaric acid or endomethylenetetrahydrophthalic anhydride) and an alcohol component such as a diol or polyol (e.g., ethylene glycol, diethylene glycol, propylene glycol, hydrogenated bisphenol A, neopentyl glycol or glycerol) in the absence of a catalyst or in the presence of a strong acid catalyst (e.g., sulfuric acid, hydrochloric acid, p-toluenesulfonic acid, etc.), using either the acid component or the alcohol component in excess.

Examples of the hydroxyalkyl acrylates or hydroxyalkyl methacrylates to be reacted with the polyester prepolymers having free carboxyl groups are 2-hydroxyethyl acrylate or 2-hydroxyethyl methacrylate, and 2-hydroxypropyl acrylate or 2-hydroxypropyl methacrylate. Furthermore, reaction of a polyester prepolymer having free hydroxyl groups with acrylic or methacrylic acid can yield a polyester acrylate or methacrylate.

The unmodified epoxy resin having a molecular weight of about 300 to about 6,000 denotes an epoxy resin which is not modified with urethane nor otherwise treated. It is an epoxy-terminated resin prepared by the action of epichlorohydrin, β-methylepichlorohydrin, etc., and a phenolic compound such as bisphenol A [2,2-bis(4-hydroxyphenyl)propane], bisphenol B [2,2-bis(p-hydroxyphenyl)butane], halogenated bisphenol A [for example, 2,2-bis(3,5-dichloro-4-hydroxyphenyl)propane], 2,2-(2',4'-dihydroxyphenyl-4''-hydroxyphenyl)propane, 4,4'-dihydroxydiphenylsulfone, resorcinol, saligenin, phloroglucinol, hydroxybenzoic acid, a novolak resin or a cresol resin.

The prepolymer having a molecular weight of about 300 to about 6,000 and having isocyanate groups is a polymer liquid at room temperature which is obtained by reacting phenylene diisocyanate, tolylene diisocyanate, hexamethylene diisocyanate, hydrogenated tolylene diisocyanate or diphenylmethane diisocyanate with ethylene glycol, diethylene glycol, tolyethylene glycol or glycerol in accordance with a recipe short of hydroxyl groups so that the resulting product may retain unreacted isocyanate.

Known methods can be utilized in the production of raw materials for the polymerizable oligomers mentioned above, and the method of introducing ethylenically unsaturated groups into the starting prepolymer is also well known in the art.

There are two synthetic approaches to the polyester acrylates which can be used in the present application; i.e., (1) via esterification reaction between a polyester prepolymer containing therein from 2 to 6 free carboxyl groups and a hydroxyalkyl acrylate, and (2) via esterification reaction between a polyester prepolymer containing therein from 2 to 6 hydroxyl groups and acrylic acid (or methacrylic acid). In case of (1), the polyester prepolymer can be obtained by means of the reaction between a diol or polyol compound and a dibasic acid in an excessive amount to the diol or polyol compound. This esterification is carried out while blowing an inert gas, such as nitrogen, into a reaction vessel over from about 1 to about 20 hours at about 120° C. to about 250° C. in the presence of an azeotropic solvent such as toluene or xylene to eliminate water formed, and if desired, by adding a catalyst such as p-toluenesulfonic acid, sulfuric acid or hydrochloric acid in an amount of from about 0.1 to about 5% by weight to the total weight of the reactants. The polyester prepolymer thus obtained is then reacted with an equivalent amount of a hydroxyalkyl acrylate or methacrylate for from about 1 to about 20 hours at a temperature of from about 80° C. to about 120° C. while blowing dired air in the presence of a thermal polymerization inhibitor in an amount of about 10 to about 10,000 ppm, the catalyst mentioned above, and the azeotropic solvent such as benzene or toluene. The reaction product is treated with an aqueous solution of calcium carbonate or ammonium hydroxide to neutralize the catalyst, followed by washing with water and the resultant polyester acrylate or methacrylate is separated. In case (2), the polyester prepolymer can be obtained via the same reaction as in case (1) except that the dibasic acid is reacted with an excessive amount of the diol or polyol component. The polyester containing free hydroxyl groups and an excess amount of acrylic acid or methacrylic acid are then reacted under the same reaction conditions as described in (1) to give the polyester acrylate or methacrylate.

The epoxy resins which can be used as the starting material for the synthesis of the epoxy resin acrylate or methacrylate are of the bisphenol type formed in the presence of a basic catalyst by the condensation reaction between the bisphenol and epichlorohydrin, and of the novolak type by the condensation between the novolak and epichlorohydrin. The bisphenol type epoxy resin is synthesized by reacting an excessive amount of the epichlorohydrin with the bisphenol for from about 30 minutes to about 5 hours at a temperature of from about 85° to about 130° C. in the presence of sodium hydroxide as the catalyst, which is added in an amount of as much as from about equimolar to about twice molar quantity to the bisphenol to give the resin carrying two terminal epoxy groups. The reaction mixture is then treated conventionally; for example, it is diluted with an organic solvent such as benzene or methyl ethyl ketone to separate out sodium chloride, followed by filtration. The filtrate is distilled to leave the epoxy resin in the distilling vessel. The novolak type epoxy resin is synthesized via a reaction between the novolak resin (obtained by the condensation of the phenol and formaldehyde) and an excessive amount of epichlorohydrin depending on the hydroxyl content of the novolak resin under the catalytic action of sodium hyroxide. In the synthesis of the novolak, phenol can be replaced by its simple derivative such a cresol or resorcinol, and formaldehyde by its lower alkyl homologue such as acetoaldehyde.

The molecular weight and epoxy content are mainly dependent on the molecular weight of the novolak resin used and its hydroxyl content, respectively. In the novolak epoxy resin synthesis, the reaction temperature is usually held at from about 100° to about 130° C. The amount of the catalyst and the reaction time are not different from those of the previously mentioned bisphenol epoxy resin synthesis.

Both epoxy resins are subjected to the addition reaction with acrylic acid or methacrylic acid to give the epoxy acrylates or methacrylates. An equimolar amount of the two reaction components are reacted at from about 60° to about 120° C. for about 5 to about 20 hours in the presence of about 0.01 to about 10 mol% of the catalyst and of about 10 to about 10,000 ppm of the thermal polymerization inhibitor, while blowing air into the reaction mixture. The catalyst suitable for this addition reaction is selected from a tertiary amine such as triethylamine or trimethylbenzylamine, a quaternary ammonium halide such as trimethylbenzylammonium chloride, and an organic tin compound such as dibutyl tin acetate or dioctyl tin laurate. The thermal polymerization inhibitor common to both polyester and epoxy acrylate is exemplified with hydroquinone, hydroquinone monomethyl ether, ditertiary butyl cresol, or cupferron. The urethane acrylate or methacrylate is generally synthesized via a two step reaction, i.e., in the first step, the polyol compound containing at least two hydroxyl groups or the polyester prepolymer containing hydroxyl groups described previously and two mols of the isocyanate compound is reacted keeping the temperature at about 60° to about 140° C. for about 0.5 to about 20 hours then cooled to about 40° to about 60° C. to form the urethane prepolymer possessing at least one isocyanate group which is then subjected further to the addition reaction, as the second step, with the equimolar quantity of the hydroxyalkyl acrylate or methacrylate being poured into the reaction mixture at about 40° to about 60° C. while blowing air into the reaction vessel which is kept at about 40° to about 60° C. The reaction is continued until the characteristic absorption band of the isocyanate moiety in I.R. region disappears. This consecutive two step reaction is carried out in the presence of the catalyst being identical with that of used in the epoxy acrylate synthesis in an amount of from about 0.001 to about 0.1 mol%. Regarding synthesis of the polyester acrylate, see U.S. Pat. No. 3,888,830, of the polyurethane acrylate see U.S. Pat. No. 3,891,523 and of the epoxy acrylate see U.S. Pat. No. 3,971,834.

SYNTHESIS EXAMPLE 4

83 g of isophthalic acid, 106 g of diethylene glycol and 146 g of adipic acid were reacted at 120° C. in the presence of p-toluenesulfonic acid as a catalyst. When the acid value of the product became 190, 116 g of 2-hydroxyethyl acrylate and 0.45 g of hydroquinone monomethyl ether as a heat polymerization inhibitor were added. The last stage of the reaction was carried out while blowing air through the reactants to form a polyester acrylate. The prepolymer prepared had a molecular weight of 720, an acid value of 5.4, a viscosity of 23 poises (at 25° C.), and an average number of ethylenically unsaturated double bonds per molecule of about 2.

Known synthesizing methods can also be applied to form the aforesaid urethane polymer. For example, see C. B. Rybny, C. A. Defazio, J. K. Shahidi, J. C. Trebellas and J. A. Vona, *Ultraviolet Radiation Cured Coating,* Journal of Paint Technology, Vol. 46, No. 596, pp. 60-69 (1974). An example is shown below.

SYNTHESIS EXAMPLE 5

174 g of tolylene diisocyanate (having a 2,4-disubstitution product/2,6-disubstitution product ratio of 80/20) and 75 g of triethylene glycol were reacted at 60° C. for 4 hours using 200 g of 1,6-hexanediol diacrylate as a diluting solvent in the presence of 0.57 g of hydroquinone monomethyl ether as a heat polymerization inhibitor while blowing dried air through the reaction system to produce a prepolymer having terminal isocyanate groups. Then, 116 g of 2-hydroxyethyl acrylate was added, and reacted at 60° C. for 6 hours to form a urethane acrylate. The urethane acrylate prepared had a molecular weight of 730, an averge number of ethylenically unsaturated double bonds per molecule of about 2, and a viscosity of the resultant reaction solution (viscosity of the reaction mixture after the reaction) of approximately 150 poises (at 25° C.).

SYNTHESIS EXAMPLE 6

|  | Parts by weight |
| --- | --- |
| Epoxy Resin (Epikote 828, a product of Shell Chemical) | 94.5 |
| Acrylic Acid | 36 |
| N,N-dimethylaniline (catalyst) | 1.3 |

The above mixture was reacted at 100° C. while blowing air therethrough to form an epoxy acrylate. The epoxy acrylate prepared had a molecular weight of 520, an acid value of 4.5, the number of ethylenically unsaturated double bonds of 2, and a viscosity of 9,000 poises (at 25° C.).

As Component (III), at least one of the polymerizable cross-linking agents and polymerizable oligomers described hereinabove can be used.

The specific compounds and synthesizing methods cited in the description of Components (I), (II) and (III) above are disclosed for purposes of illustration, and are not intended to limit the scope of this invention.

A resin composition in accordance with the present invention contains 2 to 55% by weight based on the total weight of the composition of a urethanized epoxy resin or a urethanized epoxy resin acrylate or methacrylate (Component (I)), 5 to 40% by weight of ketone resin (Component (II)) and 5 to 93% by weight of the cross-linkable or polymerizable component (Component (III)). Compositions containing the urethanized epoxy resin acrylate or methacrylate comprise 2 to 55% by weight Component (I), 5 to 40% by weight Component (II), and 5 to 93% by weight Component (III), and more preferably contain 5 to 40% by weight Component (I), 15 to 30% by weight Component (II), and 30 to 80% by weight Component (III).

Compositions containing the urethanized epoxy resin (not the acrylate or methacrylate) contain 5 to 50% by weight Component (I), 5 to 40% by weight Component (II), and 10 to 80% Component (III). More preferably, the urethanized epoxy resin composition contains 10 to 40% by weight Component (I), 20 to 35% by weight Component (II) and 30 to 70% by weight Component (III).

The Examples which follow in the specification demonstrate that resin compositions not containing one of Components (I), (II) and (III), for example, compositions containing any two of the components, are inferior in at least one of adhesion, flexibility or durability. Furthermore, compositions containing all three components but in amounts outside of the ranges disclosed above produced cured coatings which are poor.

When it is desired to change the viscosity, sensitivity or levelling property of the resin composition, it is possible to incorporate a monofunctional low viscosity monomer having an ethylenically unsaturated bond such as 2-hydroxyethyl acrylate, 2-hydroxypropyl acrylate, 2-ethylhexyl acrylate, benzyl acrylate, lauryl acrylate, tetrahydrofurfuryl acrylate or the corresponding methacrylates, α-methylstyrene, styrene, p-hydroxystyrene, p-acetylstyrene, N-methylol acrylamide, N-vinylpyrrolidone. A suitable amount of the monofunctional low viscosity monomer ranges from 0 to about 80% by weight, preferably from 0 to 40% by weight, based on the total weight of Components (I), (II) and (III).

When ultraviolet light or near ultraviolet light is used as the actinic energy radiation for curing the resin composition, it is desirable to add a photosensitizer. For this purpose, there can be used known compounds, for example, a ketone compound such as benzophenone, benzil, benzoin methyl ether, benzoin isopropyl ether, Michler's ketone, acenaphthoquinone, β-tert-butyl anthraquinone, 2-methyl anthraquinone or phenanthrenequinone, azobisisobutyronitrile, 5-nitroacenaphthene, tetramethylthiuram disulfide primulin base, triphenylamine, 4-(p-methoxyphenyl)-2,6-diphenyl pyrylium perchlorate, or its thia homolog, 2,4,6-triphenylthiapyrylium perchlorate.

To inhibit a dark reaction of the resin composition during storage, and increase its storage stability, it is desirable to add about 10 to about 1,000 ppm of a heat polymerization inhibitor such as hydroquinone, hydroquinone monomethyl ether, 2,6-di-tert-butyl-p-cresol, Cupferron, etc.

In addition, depending on use of the composition, a finely divided powder of silica may be used as a thixotropic agent and a fluorine type surface active agent such as potassium perfluorocaprate can be used as a levelling agent. Furthermore, it is possible to render the cured coated film fire-retardant by adding thereto a halogenated hydrocarbon such as hexabromobenzene or chlorinated polyethylene, a phosphoric acid ester such as tris(monochloropropyl)phosphate or tricresyl phosphate, an antimony compound such as antimony trioxide, and other known fire regardants. The aforementioned polymerization inhibitor, thixotropic agent and levelling agent are representative of those generally used in the art and any such conventional agent can be used without posing any problem.

Furthermore, depending upon the use, the resin composition can be colored. Some examples of dyes and pigments used as coloring agents are Rhodamine B [C.I. 45170B], Neo Zapon Red GE [C.I. 12715], Red [C.I. 53], Red [C.I. 57], Carmine 6B [C.I. 15850], Yellow [C.I. 7], Fanal Pink [C.I. 45160], Indanthrene Brilliant Orange GR [C.I. 71105], Indanthrene Scarlet R [C.I. 71140], Monastralmaloon [a quinacridone pigment made by Du Pont, U.S.A.], Fanal Violet [C.I. 42535 Lake], Phthalocyanine Blue [C.I. 74160], Blue [C.I. 15], Sumiblast Green G [C.I. 61565], carbon black and titanium white.

The resin composition comprising the aforesaid essential ingredients and various additives is coated on a substrate under a yellow safelight by dipping, dip and scrape, dip and squeeze, or by using various coaters such as a knife coater, wire bar or bar coater, curtain coater, spray coater, extrusion coater or various roll coaters, or by a printing method. The coating thickness of the coating composition ranges from about 1 micron to several centimeters depending upon the purpose of utilization. To cite a few examples: when the coating composition is applied on a copper-clad circuit board via screen-printing, the thickness conventionally ranges from about 10 to about 100 microns. The coating composition when used as an overcoat for a plastic floor tile is applied by means of a roll-coater to give a coating thickness of, for example, about 50 microns. In case that the coating composition is utilized for coating for a printed surface of a canister to give a glossy appearance, the thickness to be coated is, for instance, about 3 microns. The method of coating is selected depending upon the type of the substrate, the purpose of the coating, the thickness of the coated film and the required thickness precision. This selection is made in accordance with ordinary criteria in the art.

The viscosity of the coating composition is not critical, however. The viscosity is determined so as to be fixed to the way of coating and the purpose of coating. As the coating method, dip-coating, spraying, curtain coating, roll coating, knife coating and other known coating methods can be utilized for the coating composition of this invention. Furthermore, the coating composition can be used as a printing ink for screen printing and other known printing methods. The viscosity of the coating composition is adjusted so as to be suitable for a coating or printing method. Those skilled in the art are familiar with the selection of viscosity of the coating composition for any specified way of application.

Suitable substrates include, for example, pulp paper, synthetic paper-like sheets, wood, plastics, glass and metals. The resin composition of this invention can be utilized on a wide variety of substrates for various purposes, for example, to protect the surface and impart luster to flat plates of natural wood, particle boards, hard boards, print boards, iron sheets and tin plates, to impart luster and protect the surface of printed matter on paper, metals and plastics, as solder resists, resists for plating printed circuit boards, for laminating boards or flexible base boards used in the electronics industry, as marking inks containing a coloring agent, or to protect the surface of finished base boards by coating the surface in its entirety.

A layer of the resin composition, liquid at room temperature, which has been coated on a substrate cures when subjected to the actinic energy radiation. As the actinic radiation, not only electromagnetic waves in the far ultraviolet region, the ultraviolet region, then near ultraviolet region or infrared region, but also electron beams, proton beams, neutron beams, X-rays and $\gamma$-rays can be used. From the viewpoint of the rate of cure, the cost of an apparatus for generating an actinic radiation, the cost of operating the apparatus, its availability, etc., electromagnetic waves in the ultraviolet to near ultraviolet region or, if desired, electron beams generated by a high pressure cathode gun are advantageous.

As light sources for irradiation, calcium phosphate coated fluorescent lamp, high pressure mercury lamps, metal halide lamps and xenon lamps having a high luminous efficiency in the wavelength region of 240 nm to 480 nm are used. The exposure amount for ultraviolet irradiation to make the coated composition completely tack free greatly various depending upon the ratio of Components (I), (II) and (III); the amount of the sensitizer in the composition; the nature of a radiation source (e.g., the spectroscopic characteristics and the photointensity); and the radiation environment (when the coated composition is irradiated under an inert atmosphere such as nitrogen, the curing speed is considerably faster as compared to the irradiation under air). However, the coating composition may be cured on a substrate under the irradiation of the light of three high pressure mercury vapor lamps (80 w/cm) at the distance of about 15 cm while the substrate is carried on a conveyor which moves at the speed of from 1 to 20 m/min. When electron beams are irradiated on the coated composition, the irradiation dosage is generally from about 0.1 Mrad to about 20 Mrad.

In the case of irradiating electron beams, the resin composition with a coating thickness of about 20 to 300$\mu$ can be cured at a dose of 0.1 to 5.0 Mrads, and a conventional electron beam generating device for curing coated films can be directly utilized.

The following Examples illustrate the invention more specifically.

EXAMPLE 1

|  | parts by weight |
| --- | --- |
| Urethanized Epoxy Resin Solution of Synthesis Example 1 | 50 |
| Hilac 111 (ketone resin having an acid value of below 1.0 and a softening point of 110° to 120° C., made by Hitachi Chemical Co.) | 25 |
| Tetrahydrofurfuryl Alcohol Acrylate | 25 |
| Benzoic Ethyl Ether | 2 |

The above ingredients were uniformly mixed to form a resin composition having a viscosity of 94 poises (25° C.).

The resulting resin composition and the compositions of Comparative Examples 1 and 2 below were each cured using a high pressure mercury lamp (80 w/cm) by making one pass at a conveyor speed of m/min at a distance of 15 cm. The cured coated films were tested for adhesion and flexibility in the manner explained below, and the results shown in Table 1 were obtained.

COMPARATIVE EXAMPLE 1

The same composition as in Example 1 except that the urethanized epoxy resin solution was omitted was exposed as in Example 1 and tested as described below.

COMPARATIVE EXAMPLE 2

The same composition as in Example 1 except that the ketone resin was omitted was exposed as in Example 1 except 2 passes were made and tested as described below.

A high pressure mercury lamp HO-2L21 (80w/cm) made by Iwasaki Electric Co., Ltd. was used to cure the composition as a substrate having a coated film formed on it was passed on a steel wire mesh belt spaced apart at a distance of 14 cm.

The adhesion test shown in the table was performed by photocuring a film of the above resin compositions having a thickness of 30 to 40$\mu$ on a sheet of glass and copper foil (defined below), respectively. The cured film was cross-cut into 10 mm squares having a width of 1 mm. A cellophane tape was applied to the coated film, and then peeled off. The samples were evaluated by counting the number of squares which did not peel from the substrate out of 100 squares. For example, when 100 squares remain, the test result is expressed as 100/100 (good adhesion); when 50 squares remain, the result is expressed as 50/100 (somewhat poor adhesion); and when no squares remain, the result is expressed as 0/100 (poor adhesion).

For the flexibility test, a cured film on a 1 ounce copper foil (35$\mu$ thick) substrate was bent 180°, and examined for the presence of cracks in the bent portion. When there were no cracks, the flexibility was graded A, and when cracks or partial peeling occurred, the flexibility was graded B.

TABLE 1

| | Adhesion and Flexibility Test | | | |
| --- | --- | --- | --- | --- |
| Substrate | Test | Example 1 | Comparative Example 1 | Comparative Example 2 |
| Copper Foil | Adhesion | 100/100 | Peeled upon cross-cutting | 30/100 |
| Glass Sheet | Flexibility | A | B | A |
| | Adhesion | 100/100 | Peeled upon cross-cutting | 0/100 |

In the following Examples 2 and 3 and associated Comparison Examples, photocuring and the adhesion and flexibility tests were performed by the same methods.

EXAMPLE 2

| | parts by weight |
|---|---|
| Urethanized Epoxy Resin (EPU-6, a product of Asahi Denka; epoxy equivalent: 200 to 250; acid value: 3.5) | 35 |
| Hilac 111 | 20 |
| Polyester Acrylate of Synthesis Example 4 | 30 |
| 2-Hydroxypropyl Methacrylate | 10 |
| Benzoin Ethyl Ether | 0.8 |
| Benzil | 1.5 |

These ingredients were mixed to prepare a resin having a viscosity of 108 poises (25° C.).

COMPARATIVE EXAMPLE 3

The same composition as in Example 2 was used except the urethanized epoxy resin was omitted was tested for adhesion and flexibility as in Example 1.

COMPARATIVE EXAMPLE 4

The same composition as in Example 2 was used except the ketone resin was omitted was tested for adhesion and flexibility as in Example 1.

The compositions of Example 2 and Comparative Examples 3 and 4 were each coated on a copper foil, a glass sheet and a phenol resin plate, respectively, and cured by light irradiation from a high pressure mercury lamp as in Example 1 except 2 passes were made with Example 2 and Comparative Example 3 and 3 passes were made for Comparative Example 4. The cured films were adhesion and flexibility tested, and the results shonw in Table 2 were obtained.

TABLE 2

| | Adhesion and Flexibility Tests | | | |
|---|---|---|---|---|
| Substrate | Test | Example 2 | Comparative Example 3 | Comparative Example 4 |
| Copper Foil | Adhesion | 100/100 | Peeled upon cross-cutting | 10/100 |
| | Flexibility | A | B | A |
| Glass Sheet | Adhesion | 100/100 | Peeled upon cross-cutting | 0/100 |
| Phenolic Resin Plate | Adhesion | 100/100 | Peeled upon cross-cutting | 15/100 |

EXAMPLE 3

| | parts by weight |
|---|---|
| Urethanized Epoxy Resin (EPUX-11 having an epoxy equivalent of 340 to 390 and a viscosity (at 25° C.) of 150 to 200 cp., made by Asahi Denka) | 25 |
| Hilac 110 (ketone resin having an acid value of below 1.0 and a softening point of 110° to 130° C., made by Hitachi Chemical) | 25 |
| Urethane Acrylate of Synthesis Example 5 | 10 |
| Tetrahydrofurfuryl Alcohol Acrylate | 20 |
| Benzoin Methyl Ether | 2.3 |

These ingredients were mixed to form a resin composition having a viscosity of 38 poises (25° C.). They were then coated on a support, exposed by making 2 passes under the mercury vapor lamp of Example 1 and tested as above.

COMPARATIVE EXAMPLE 5

The same composition as in Example 3 except the urethanized epoxy resin was omitted was coated on a support, exposed as in Comparative Example 3 and tested as in Example 1.

COMPARATIVE EXAMPLE 6

The same composition as in Example 3 except the ketone resin was omitted was coated on a support, exposed as in Comparative Example 4 and tested as in Example 1.

COMPARATIVE EXAMPLE 6b

The same composition as in Example 3 was used except that the urethane acrylate of Synthesis Example 5 and the tetrahydrofurfuryl alcohol acrylate were omitted, and instead, 45 parts by weight of methyl cellosolve acetate, a nonfunctional diluent was added.

The compositions of Example 3 and Comparative Examples 5 and 6 were each coated on the substrates shown in Table 3, and photocured. The cured coated films were adhesion and flexibility tested, and the results are shown in the following Table 3.

With the Comparative Example 6b composition, a rise in the viscosity of the composition was noted upon storage for 3 to 4 hours. Its coated film (which was heat dried to remove the non-functional diluent) showed a markedly slow rate of curing. The films were tacky and they cured unsatisfactorily. Thus, they could not be tested for adhesion and flexibility.

TABLE 3

| | Adhesion and Flexibility Tests | | | |
|---|---|---|---|---|
| Substrate | Test | Example 3 | Comparative Example 5 | Comparative Example 6 |
| Copper Foil | Adhesion | 100/100 | Peeled upon cross-cutting | 20/100 |
| | Flexibility | A | B | A |
| Aluminum Plate | Adhesion | 100/100 | Peeled upon cross-cutting | 5/100 |
| Glass Plate | Adhesion | 100/100 | Peeled upon cross-cutting | 0/100 |

The composition of Example 3 was screen-printed through a circuit pattern having a minimum line width of 250μ on a copper foil-polyimide resin laminate flexible base board (a product of Lex Ham Company, U.S.A., obtained by laminating a 1 ounce copper foil on a 35μ polyimide resin of Du Pont with an adhesive layer about 30μ in thickness). The resistance of the printed circuit to plating was tested as follows.

The circuit pattern of the composition which had been screen-printed on the copper foil was photocured and plated with copper pyrophosphate at a temperature of 55° C., a pH of 8.7 and a cathode current density of 4 A/dm$^2$. Changes of the cured film after plating, changes of the pattern by the intrusion of the plating solution were examined. The analysis shows that the printed circuit showed sufficient resistance to plating.

The composition of Example 3 was also coated on a glass fiber-reinforced epoxy copper base board (a product of Sumitomo Denko), and photocured. The coated plate was dipped twice in a solder bath maintained at 260° C. for 5 seconds to 10 seconds, and changes in the cured coating were examined. No change was noted.

EXAMPLE 4

| | parts by weight |
|---|---|
| Urethanized Epoxy Resin (EPU-15 having an epoxy equivalent of 450 to 510 and a viscosity (at 25° C.) of 400 to 600 poises, made by Asahi Denka) | 41 |
| Hilac 111 (ketone resin, a product of Hitachi Chemical) | 24 |
| Trimethylolpropane Trimethacrylate | 13 |
| 1,6-Hexanediol Dimethacrylate | 25 |

The above ingredients were mixed to prepare a resin composition having a viscosity of 80 poises (25° C.).

The resin composition was coated to a thickness of 50μ on hard board and subjected to the irradiation with electron beams at an acceleration voltage of 300 kv and a current density of 20 mA. The coated film cured at a dose of 0.8 Mrad.

EXAMPLE 5

| | parts by weight |
|---|---|
| Urethanized Epoxy Acrylate Solution of Synthesis Example 2 | 60 |
| Hilac 111 (ketone resin produced by Hitachi Chemical) | 20 |
| Trimethylolpropane Triacrylate | 10 |
| 2-Hydroxypropyl Acrylate | 10 |
| Benzoin Ethyl Ether | 2 |

These ingredients were mixed uniformly to form a resin composition having a viscosity of 30 poises (25° C.).

The above composition and the compositions in Comparative Examples 7 and 8 below were coated on steel and glass sheets in a thickness of 30 to 40μ and each exposed to light irradiation from a high pressure mercury lamp as in Example 1. The cured coated films were adhesion tested as in Example 1, and the results shown in Table 4 were obtained.

COMPARATIVE EXAMPLE 7

The composition resulting from the removal of the urethanized epoxy acrylate from the composition of Example 5.

| | parts by weight |
|---|---|
| Ketone Resin (Hilac 111) | 20 |
| Trimethylolpropane Acrylate | 34 |
| 2-Hydroxypropyl Acrylate | 10 |
| Benzoin Ethyl Ether | 2 |

COMPARATIVE EXAMPLE 8

The composition resulting from the removal of the ketone composition from the composition of Example 5.

| | parts by weight |
|---|---|
| Urethanized Epoxy Acrylate Solution of Synthesis Example 2 | 60 |
| Trimethylolpropane Triacrylate | 10 |

| | parts by weight |
|---|---|
| 2-Hydroxypropyl Acrylate | 10 |
| Benzoin Ethyl Ether | 2 |

The Comparative Example 7 and 8 compositions were exposed and tested as in Example 1.

TEST 4

| | Adhesion Test | | |
|---|---|---|---|
| Substrate | Example 5 | Comparative Example 7 | Comparative Example 8 |
| Steel Sheet | 100/100 | 60/100 | 10/100 |
| Glass Sheet | 100/100 | 0/100 | 0/100 |

EXAMPLE 6

| | parts by weight |
|---|---|
| Urethanized Epoxy Acrylate Solution of Synthesis Example 3 | 45 |
| Ketone Resin (Hilac 111) | 30 |
| Trimethylolpropane Triacrylate | 15 |
| Tetrahydrofurfuryl Acrylate | 10 |
| Benzoin Ethyl Ether | 0.5 |
| Benzil | 1.7 |

These ingredients were mixed to form a resin composition having a viscosity of 35 poises (25° C.).

COMPARATIVE EXAMPLE 9

The composition resulting from the removal of urethanized epoxy acrylate of Example 6.

| | parts by weight |
|---|---|
| Ketone Resin | 30 |
| Trimethylolpropane Triacrylate | 30 |
| Tetrahydrofurfuryl Acrylate | 10 |
| Benzoin Ethyl Ether | 0.5 |
| Benzil | 1.7 |

COMPARATIVE EXAMPLE 10

The composition resulting from the removal of the ketone resin of Example 6.

| | parts by weight |
|---|---|
| Urethanized Epoxyacrylate Solution of Synthesis Example 3 | 45 |
| Trimethylolpropane Triacrylate | 15 |
| Tetrahydrofurfuryl Acrylate | 10 |
| Benzoin Ethyl Ether | 0.5 |
| Benzil | 1.7 |

The compositions of Example 6, Comparative Example 9 and Comparative Example 10 were each coated on a steel sheet, a glass sheet and an aluminum sheet, and cured by light irradiation as in Example 1. The cured coated films were each tested and the results shown in Table 5 were obtained.

TABLE 5

| | Adhesion Test | | |
|---|---|---|---|
| Substrate | Example 6 | Comparative Example 9 | Comparative Example 10 |
| Steel Sheet | 100/100 | 70/100 | Peeled at the time of |

TABLE 5-continued

| Substrate | Adhesion Test | | |
|---|---|---|---|
| | Example 6 | Comparative Example 9 | Comparative Example 10 |
| Glass Sheet | 100/100 | Peeled at the time of cutting | cutting Peeled at the time of cutting |
| Aluminum Sheet | 100/100 | 20/100 | 0/100 |

EXAMPLE 7

| | parts by weight |
|---|---|
| Urethanized Epoxy Acrylate Solution of Synthesis Example 3 | 30 |
| Ketone Resin (Hilac 110) | 25 |
| Epoxy Acrylate of Synthesis Example 6 | 20 |
| Diethylene Glycol Diacrylate | 25 |
| Benzophenone/Michler's Ketone = 8:1 | 2.5 |

These ingredients were mixed to form a resin composition having a viscosity of 35 poises (25° C.).

COMPARATIVE EXAMPLE 11

The composition resulting from the removal of the urethanized epoxy acrylate of Example 7.

| | parts by weight |
|---|---|
| Ketone Resin (Hilac 111) | 25 |
| Epoxy Acrylate of Synthesis Example 6 | 20 |
| Trimethylolpropane Triacrylate | 10 |
| Diethylene Glycol Diacrylate | 25 |
| Benzophenone: Michler's Ketone = 8:1 | 2.5 |

COMPARATIVE EXAMPLE 12

The composition resulting from the removal of the ketone resin of Example 6.

| | parts by weight |
|---|---|
| Urethanized Epoxy Acrylate Solution of Synthesis Example 3 | 30 |
| Epoxy Acrylate of Synthesis Example 6 | 20 |
| Diethylene Glycol Diacrylate | 25 |
| Benzophenone: Michler's Ketone = 8:1 | 2.5 |

The composition of Example 7, Comparative Example 11 and Comparative Example 12 were coated on a stainless steel sheet, a copper sheet, and a glass sheet, and cured by light irradiation as in Example 1. The cured coated films were tested, and the results shown in Table 6 were obtained.

| Substrate | Adhesion Test | | |
|---|---|---|---|
| | Example 7 | Comparative Example 11 | Comparative Example 12 |
| Stainless Steel | 100/100 | 90/100 | 20/100 |
| Copper Sheet | 100/100 | 70/100 | 10/100 |
| Glass Sheet | 100/100 | 50/100 | 0/100 |

The composition of Example 7 was screen-printed through a circuit pattern with a minimum line width of 250µ on a glass fiber-reinforced epoxy copper laminate board (a product of Sumitomo Denko Kabushiki Kaisha), and its resistance to plating was tested. Specifically, the circuit pattern of the composition screen-printed on the copper laminate board was photocured, and plated with copper pyrophosphate in a bath temperature of 55° C. and a pH of 8.7 while maintaining the current density at the cathode at 4 A/dm$^2$. Changes in the cured coating after plating and changes of the pattern by the intrusion of the plating solution were examined. No changes were noted, and the coating was found to have sufficient resistance to plating.

Furthermore, the composition of Example 7 was coated on a copper foil-polyimide resin laminate flexible substrate (a product of Lex Ham Company of U.S.A. obtained by laminating 1 ounce of copper foil to a 35µ thick polyimide base made by Du Pont of U.S.A. with an adhesive layer of about 30µ thick) and photocured. The substrate was then dipped for 1 minute in a solder bath maintained at 260° C. No changes in the cured coating were noted, and the coating was found to have sufficient thermal stability. At the same time, the cured film on the copper foil-polyimide resin laminate flexible substrate was dipped in trichloroethylene for 1 hour. No changes such as swelling or peeling were noted, and the cured coated film was found to have sufficient solvent resistance.

EXAMPLE 8

| | parts by weight |
|---|---|
| Urethanized Epoxy Acrylate of Synthesis Example 2 | 33 |
| Ketone Resin (Hilac 111) | 27 |
| Polyester Acrylate of Synthesis Example 4 | 22 |
| 2-Hydroxypropyl Acrylate | 18 |

These ingredients were well mixed to obtain a resin composition having a viscosity of 67 poises (25° C.).

The above composition was coated to a thickness of 100µ on a hard board, and exposed to irradiation of electron beams at an acceleration voltage of 400 kv and a current density of 20 mA. The coated film cured at a dosage of 1.5 Mrads.

While the invention has been described in detail and with reference to specific embodiments thereof, it will be apparent to one skilled in the art that various changes and modifications can be made therein without departing from the spirit and scope thereof.

What is claimed is:

1. A radiation curable resin composition comprising, as essential ingredients:
    (I) a urethanized epoxy resin obtained by reacting a compound containing at least one epoxy group and at least one hydroxyl group with a compound containing at least one isocyanate group, or a urethanized epoxy resin acrylate or methacrylate obtained by the addition of acrylic acid or methacrylic acid to said urethanized epoxy resin;
    (II) a ketone resin obtained by condensing a ketone compound with an aldehyde, and
    (III) a cross-linkable or polymerizable compound containing at least two ethylenically unsaturated groups, wherein said Components (I), (II) and (III) are present in amounts of 2 to 55% by weight for Component (I), 5 to 40% by weight for Component (II), and 5 to 93% by weight for Component (III).

2. The resin composition of claim 1, wherein said Component (I) is a urethanized epoxy resin.

3. The resin composition of claim 1, wherein said Component (I) is a urethanized epoxy resin acrylate.

4. The resin composition of claim 2, wherein said Components (I), (II) and (III) are present in amounts of 5 to 50% by weight for Component (I), 5 to 40% by weight for Component (II), and 10 to 80% by weight for Component (III).

5. The resin composition of claim 3, wherein said Components (I), (II) and (III) are present in amounts of 2 to 55% by weight for Component (I), 5 to 40% by weight for Component (II), and 5 to 93% by weight for Component (III).

6. The resin composition of claim 4, wherein said Components (I), (II) and (III) are present in amounts of 10 to 40% by weight for Component (I), 20 to 35% by weight for Component (II) and 30 to 70% by weight for Component (III).

7. The resin composition of claim 5, wherein said Components (I), (II) and (III) are present in amounts of 5 to 40% by weight for Component (I), 15 to 30% by weight for Component (II) and 30 to 80% by weight for Component (III).

8. The resin composition of claim 1, wherein said ketone resin is a dehydro-condensation product of at least one member selected from the group consisting of dialkyl ketones, cycloalkylene ketones, alkylaryl ketones, and diaryl ketones; and a lower alkyl aldehyde.

9. The resin composition of claim 1, wherein said Component (III) is a cross-linking agent containing 2 to 6 unsaturated groups obtained by esterifying a compound having 2 to 6 hydroxyl groups with acrylic acid or methacrylic acid.

10. The resin composition of claim 1, wherein said Component (III) is a polymerizable oligomer selected from the group consisting of a polyester acrylate obtained by reacting a polyester prepolymer containing free carboxylic groups with a hydroxyalkyl acrylate or a hydroxyalkyl methacrylate, or a polyester acrylate obtained by reacting a polyester prepolymer containing a free hydroxyl group with acrylic acid or methacrylic acid.

11. The resin composition of claim 1, wherein said Component (III) is a urethane acrylate or a urethane methacrylate obtained by reacting a urethane prepolymer containing an isocyanate group with a hydroxyalkyl acrylate or a hydroxymethyl methacrylate.

* * * * *